Aug. 4, 1942.   A. RAMSEY   2,291,647
SEQUENTIAL FUSE RECLOSING MECHANISM
Filed Oct. 12, 1936   5 Sheets-Sheet 1

Inventor
Allan Ramsey
By
Attys

Aug. 4, 1942.  A. RAMSEY  2,291,647
SEQUENTIAL FUSE RECLOSING MECHANISM
Filed Oct. 12, 1936  5 Sheets-Sheet 2
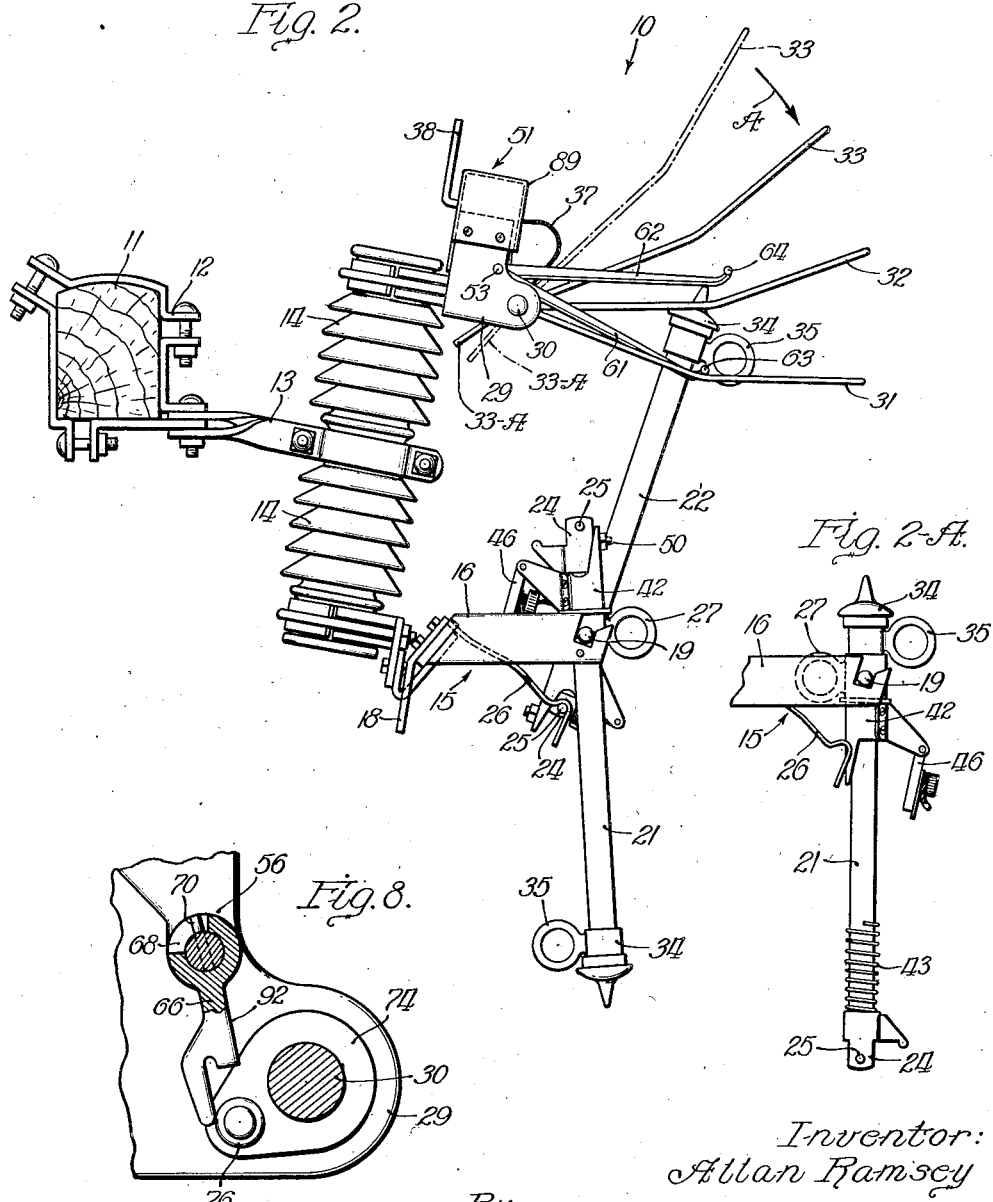
Inventor:
Allan Ramsey
By Brown Jackson Boettcher Dienner
Att'ys.

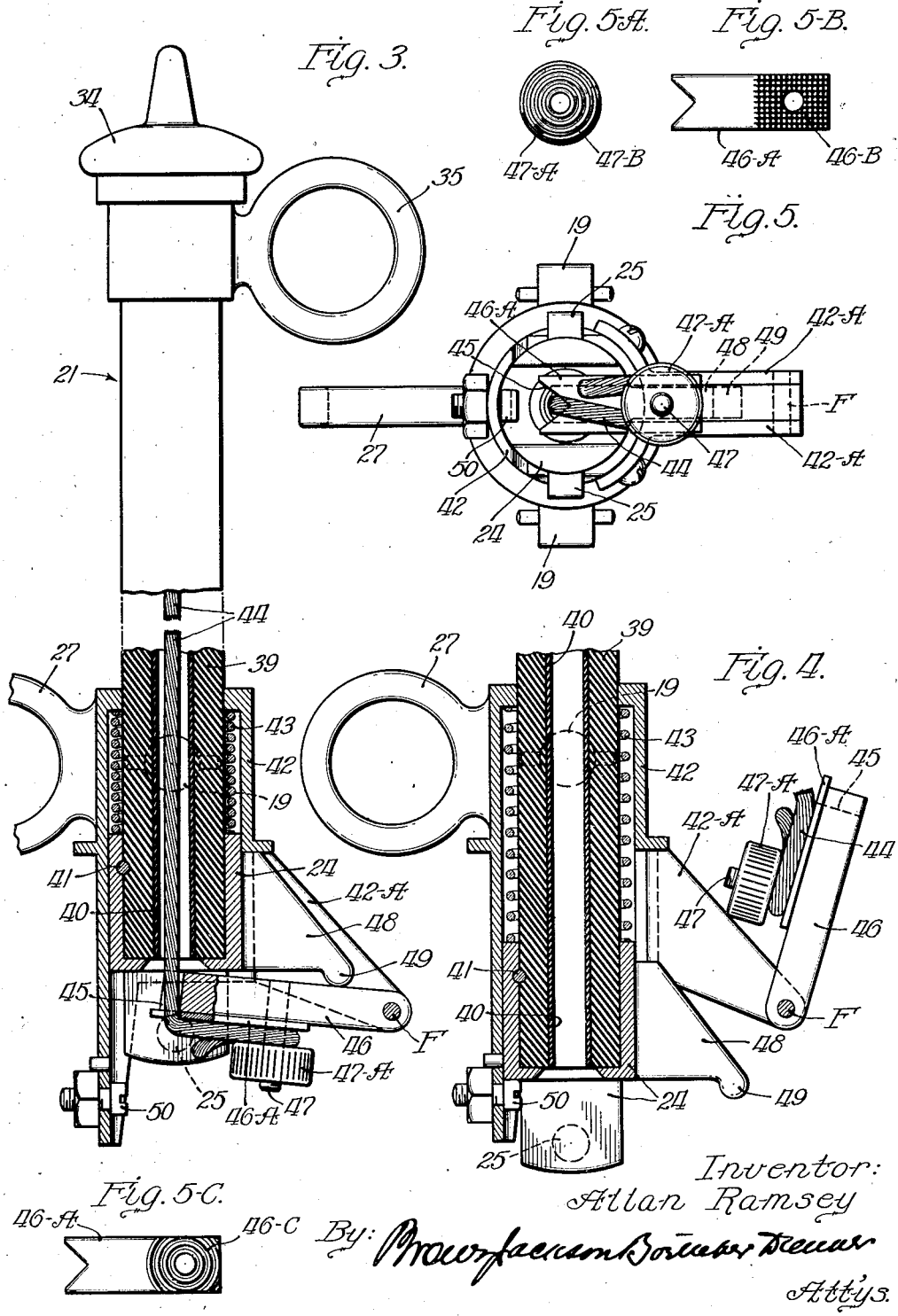

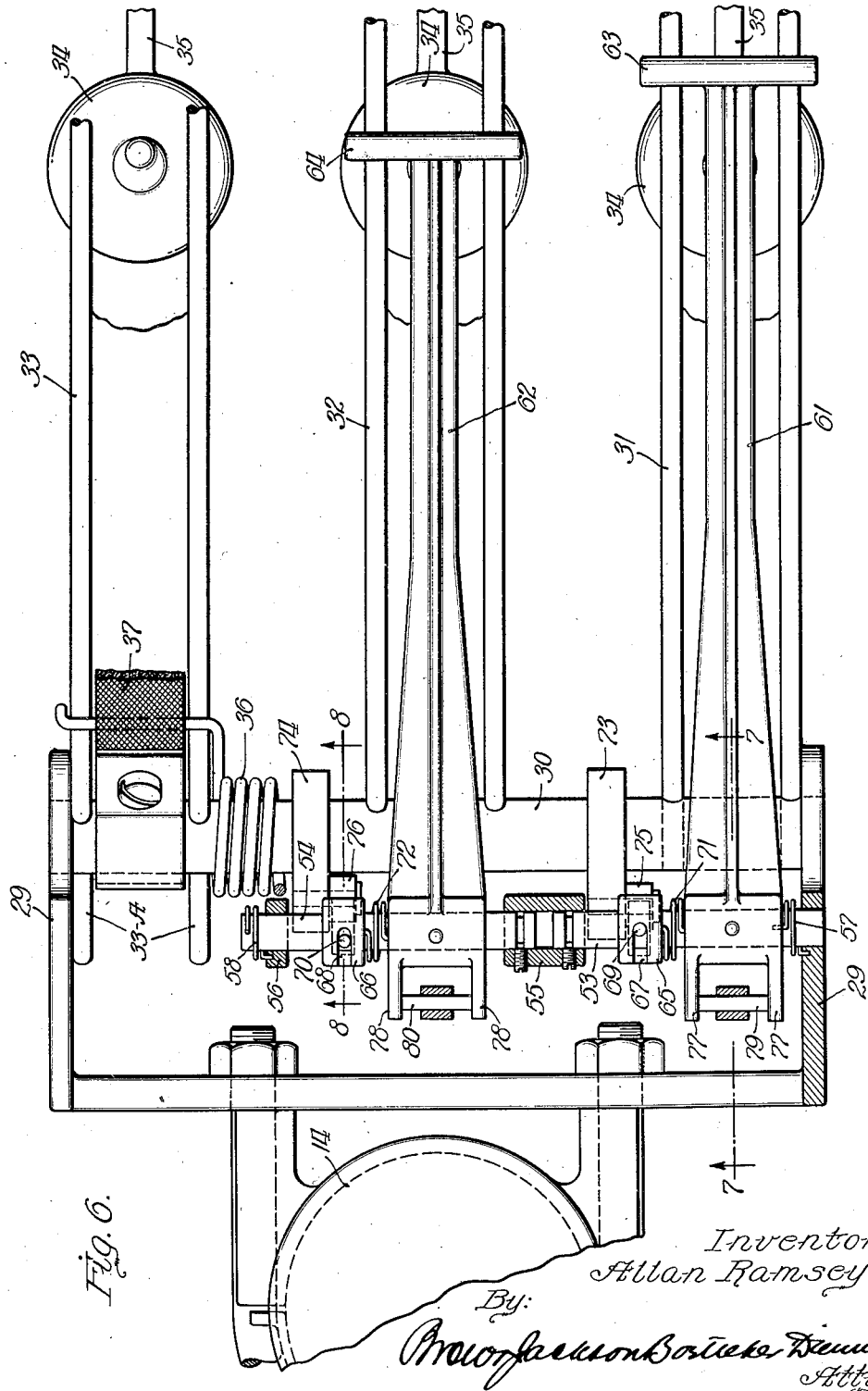

Aug. 4, 1942.　　　　A. RAMSEY　　　　2,291,647
SEQUENTIAL FUSE RECLOSING MECHANISM
Filed Oct. 12, 1936　　　5 Sheets-Sheet 5

Inventor:
Allan Ramsey
By:
Brown, Jackson, Boettcher, Dienner
Attys.

Patented Aug. 4, 1942

2,291,647

UNITED STATES PATENT OFFICE 2,291,647

SEQUENTIAL FUSE RECLOSING MECHANISM

Allan Ramsey, Evanston, Ill., assignor to Schweitzer & Conrad, Inc., Chicago, Ill., a corporation of Delaware Application October 12, 1936, Serial No. 105,311

42 Claims. (Cl. 200—126)

My invention relates, generally, to electric circuit control devices, and it has particular relation to sequentially operating fuse reclosing mechanisms.

With a view to maintaining a continuity of flow of electric power as well as to protect the power system against faults, it is the practice to provide for automatically opening the circuit on occurrence of a fault and then to reclose it one or more times. Operating experience indicates that a large percentage of the faults on an electric power line are of momentary duration and that the circuit may be safely reclosed shortly after the fault occurs.

Reclosing circuit breaker apparatus has been devised for this purpose. Ordinarily this apparatus comprises a switch, mechanism for operating the switch to the open and closed positions, fault sensitive relays, and a periodic recloser device. Upon the occurrence of a fault, as indicated by one of the relays, the switch is tripped and the circuit is opened. The recloser device is initiated into operation and effects the energization of the mechanism for closing the switch. This cycle of operation is repeated for a number of times, depending upon the adjustment of the recloser device.

Such apparatus is expensive and finds its economical application, generally, where the power demand is relatively high. It is not feasible to apply it to lines such as exist in rural communities, where the load is relatively light and conditions do not justify the installation of this type of equipment. However, it is highly desirable to provide for protecting these lines on the occurrence of faults and at the same time to maintain continuity of service by reclosing the circuit after the fault has cleared. This obviates the necessity for immediately sending a lineman from the usually remote headquarters to the protective apparatus which has operated, for the purpose of restoring the service.

For this purpose, reclosing fuse devices are especially adapted, since they require a minimum of expense for first cost and the fuse devices are relatively inexpensive. These devices usually comprise two or three individual fuse devices that are mounted on a common supporting and insulating structure and one of which is connected in the circuit to be protected while the other device or devices are arranged for shunt circuit connection with the one device, but the shunt circuit or circuits are normally open. When the fuse device connected in the circuit blows, a transfer switch is operated to close one of the shunt circuits for reestablishing the circuit through the next fuse device. If the fault has cleared in the meantime, the circuit is maintained through this fuse device; if not, then the next transfer switch is operated, if more than two fuse devices are employed, and the circuit is again established. When the last fuse device has blown, the circuit remains open and the fuse devices must be replaced for further operation.

It is, therefore, an object of my invention to provide a sequentially operating fuse reclosing mechanism which shall be simple and efficient in operation and which can be readily and economically manufactured and installed.

An important object of my invention is to provide for reestablishing an electric circuit through one or more fuse devices in the event that the fuse device in the circuit blows.

Another important object of my invention is to provide a predetermined time delay between the blowing of one fuse device and the reestablishment of the circuit through another fuse device by means of a quick acting switch arm which operates at the expiration of the predetermined time delay period.

Another important object of my invention is to provide for clearing the circuit by dropping out a fuse device when it blows and establishing the circuit through another fuse device of like construction after the expiration of a predetermined interval.

Another object of my invention is to provide for mounting a fuse device in such manner as to permit placing thereof in operative position by a rotary movement and to permit its dropping out of the operative position upon blowing of its fusible element by a translatory movement.

A further object of my invention is to provide for rotatably mounting a plurality of fuse devices at their lower ends and sequentially shifting the circuit to the upper end of the next fuse device when the preceding fuse device blows.

Another object of my invention is to provide an unobstructed path for the exhaustion of gases generated in a fuse tube on blowing of the fusible element therein and at the same time extending the gap caused by the blowing of the fusible element.

Another object of my invention is to provide for rotatably mounting and latching a fuse device at one end, thereby leaving the other end free of supporting and latching mechanisms.

Still another object of my invention is to provide for introducing a time delay between the blowing of one fuse device of a sequentially operating fuse reclosing mechanism and the connection of the upper end of the next fuse device in the circuit.

Another object of my invention is to provide for latching the fuse devices of a sequentially operating fuse reclosing mechanism at their lower ends with their upper ends free and shifting the circuit from the upper end of one fuse device to the upper end of the next fuse device upon blowing of the preceding fuse device.

Other objects of my invention will, in part, be obvious and in part appear hereinafter.

My invention, accordingly, is disclosed in the embodiment thereof shown in the accompanying drawings, and it comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figure 2 is a view in side elevation, at a reduced scale, of the reclosing fuse mechanism shown in Figure 1;

Figure 7:
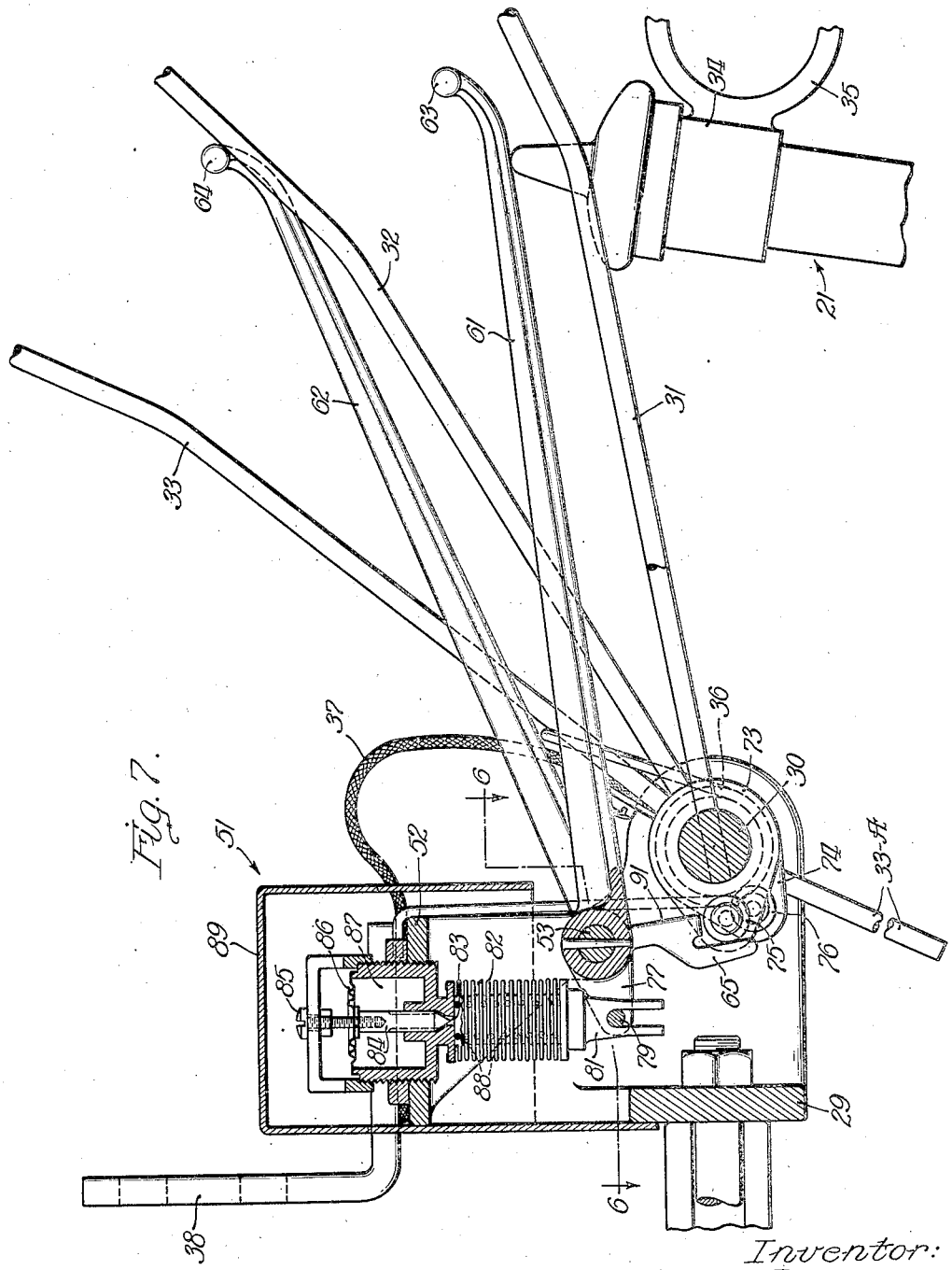

Figure 2—A is a fragmentary view, in side elevation, of the reclosing mechanism, showing the position to which one of the fuse devices moves when it is mounted for translatory movement;

Figure 3 is a view, partly in side elevation and partly in section, showing certain of the details of construction of the fuse devices which are employed in practicing my invention;

Figure 4 is a fragmentary sectional view of one of the fuse devices, showing the position to which the various parts of the fuse device are operated when it blows;

Figure 5 is a view, in bottom plan, of the fuse device shown in Figure 3;

Figures 5—A, 5—B and 5—C show certain details of construction of the holding device for the flexible conductor connected to the fusible element;

Figure 6 is a view, taken along the line 6—6 of Figure 7, illustrating certain of the details of the time delay mechanism;

Figure 7 is a sectional view, taken along the line 7—7 of Figure 6, showing other details of the time delay mechanism; and Figure 8 is a sectional view, taken along the line 8—8 of Figure 6, showing the arrangement of one of the cams for the time delay mechanism.

According to my invention, I have provided for rotatably mounting three fuse devices at their lower ends in a plane which is slightly inclined from the vertical. Each of the fuse devices is latched at its lower end in a suitable mounting bracket which itself is mounted on the lower end of a suitable insulator. Thus the fuse devices are independently mounted at their lower ends, while their upper ends are free. On blowing of any one of the fuse devices its latching mechanism is released and it rotates about its lower end to completely clear the circuit.

Mounted at the upper end of the insulator is a suitable support member in which is journaled a shaft that carries three contact members which are mounted in staggered relation and each of which is aligned with the upper terminal of one of the fuse devices. A spring is provided for biasing the shaft in such a direction that the contact members tend to rotate into engagement with the upper ends of the fuse devices. Normally only one of the contact members is in engagement with the upper end of one of the fuse devices. The remaining contact members are disposed above the upper ends of the other two fuse devices and, accordingly, they are normally out of the circuit which extends between the support members carried at the upper and lower ends of the insulator.

In the event that a fault occurs on the circuit to which the sequential fuse mechanism is connected, the fuse device which is connected therein blows, and it is released at its lower end for rotation to clear the circuit. The contact member individual to the next fuse device is rotated into engagement with its upper terminal by the spring and the circuit is reestablished through this fuse device. If this fuse device blows, then it also rotates about its lower end and the next contact member engages its corresponding upper terminal of the next and last fuse device to reestablish the circuit therethrough. When this last fuse device blows, it also rotates about its lower end and the circuit is completely cleared, requiring the services of a lineman to restore it to its normally operating condition.

In order to provide a predetermined time delay between the blowing of one fuse device and the connection of the next fuse device in the circuit, a time delay mechanism is provided for delaying the rotation of the shaft carrying the contact members, so that the next fuse device is not connected into the circuit by engagement of its contact member with its upper terminal until after a predetermined interval has elapsed after the preceding fuse device has blown and rotated to its blown position. The time delay mechanism comprises a flexible bellows filled with a suitable liquid, such as a mixture of alcohol and glycerine, and a timing lever individual to each of the first two fuse devices. Each timing lever is mounted on an independent shaft and is provided with a detent which is arranged to engage a roller carried by a cam on the shaft which supports the contact members. On the blowing of either of the first two fuse devices, the corresponding timing lever is released but its movement is delayed by the flow of liquid from the flexible bellows until, after a predetermined interval, the detent is moved out of the path of the roller carried by the cam and the shaft is permitted to rotate to bring the next contact member into engagement with the upper terminal of the next fuse device.

It will be obvious that a single time delay unit may be provided for effecting a single reclosure when only two fuse devices are provided. In like manner, more than three fuse devices may be provided for permitting a corresponding increased number of reclosures, as may be desired.

Figure 1:
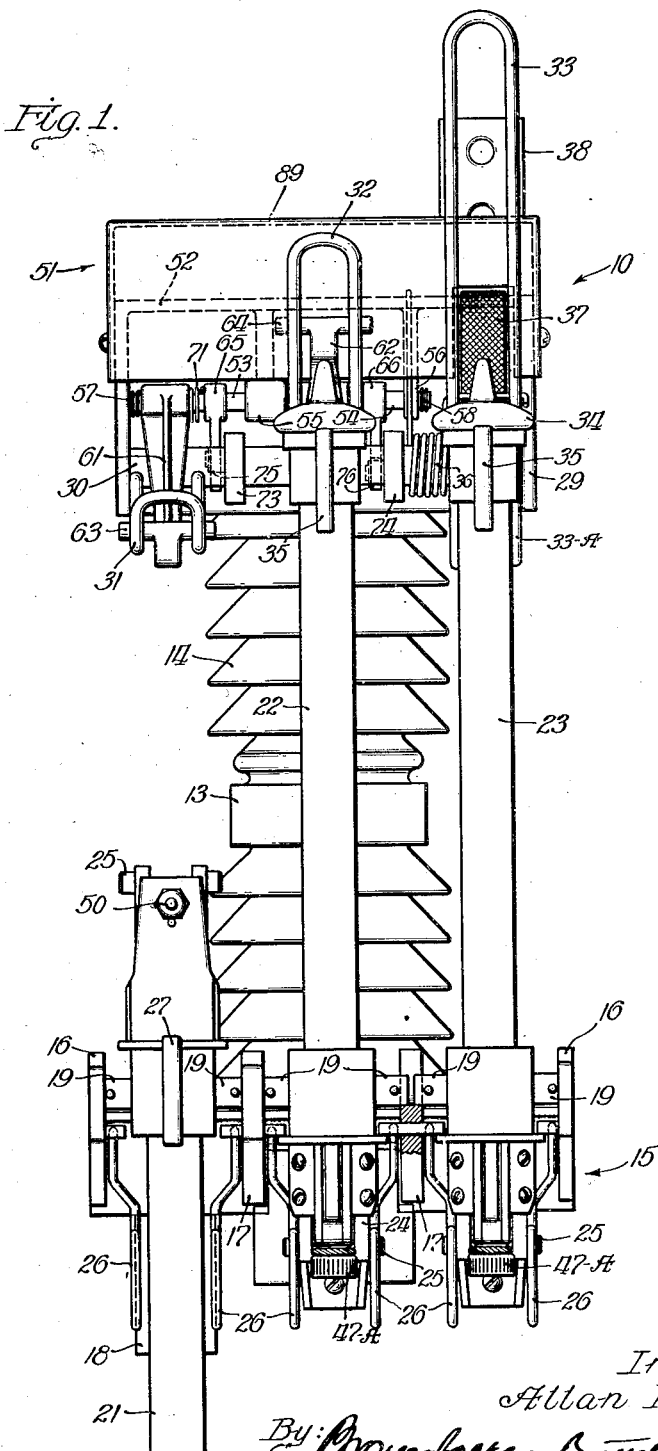
Figure 1 is a view, in front elevation, of a concrete embodiment of my sequentially operating fuse reclosing mechanism, one of the fuse devices being shown in the blown position.

Referring now particularly to Figures 1 and 2 of the drawings, it will be observed that the reference character 10 designates, generally, a sequentially operating fuse reclosing mechanism which may be mounted on a suitable cross arm 11 by a suitable clamp 12. A clamp 13 is provided for mounting an insulator 14 on the clamp 12. It will be understood that any other suitable type of mounting may be provided and that other forms of insulators may be employed without departing from the scope of my invention.

At the lower end of the insulator 14 a lower support bracket, shown generally at 15, is provided which comprises a pair of outer arms 16 and a pair of intermediate arms 17, formed preferably of a conducting material such as copper, to which a connector 18 is connected for forming one terminal of the reclosing mechanism. The arms 16 and 17 are provided with slots opening upwardly in which trunnions 19 of fuse devices 21, 22 and 23 may be mounted for rotation. It will be noted that the trunnions of the fuse device 22 and the inside trunnions of the fuse devices 21 and 23 are mounted for rotation in the slots of the intermediate arms 17, while the outer trunnions of the fuse devices 21 and 23 are mounted in the arms 16. Each of the fuse devices is provided with a ferrule 24 at its lower end, having outwardly extending pins 25 which are arranged to engage downturned loop portions of spring wires 26, a pair of the spring wires 26 being individual to each of the fuse devices and serving not only to provide a good electrical connection between the ferrules 24 and the terminal 18, but also to hold the fuse devices in the substantially upright position. The fuse devices are placed in position by inserting the trunnions 19 in the slots of the arms 16 and 17 and rotating them in a counterclockwise direction, as viewed in Figure 2 of the drawings, until the pins 25 engage the downturned loop portions of the spring wires 26. As shown in Figure 1, the rear portions of the spring wires 26 are spaced further apart than the front portions in order to permit the pins 25 to pass therebetween. A ring 27 is provided on each of the ferrules 24 for lifting the fuse devices into the support brackets 15.

At the upper end of the insulator 14 an upper support member 29 is mounted having journaled therein a transverse shaft 30 formed preferably of conducting material, such as copper or brass. Mounted for rotation with the shaft 30 are contact arms 31, 32 and 33 which, as illustrated, are positioned in staggered relation and each is aligned with one of the fuse devices 21, 22 and 23, respectively. The contact members 31, 32 and 33 are formed of conducting material, such as copper wire, into U-shaped members having the outer ends slightly upturned to permit sliding engagement with upper terminals or contact ferrules 34 of the fuse devices. A ring 35 is provided on each of the contact ferrules 34 for swinging the fuse devices into operative position. The contact members 31, 32 and 33 are biased for rotation in the direction indicated by the arrow A, by means of a spiral spring 36 which is mounted coaxially with the shaft 30, one end being secured to the contact member 33 and the other end being suitably fastened to the upper support member 29. In order to limit the rotation of the shaft 30 after the last fuse device 23 has blown, the contact member 33 is provided with extensions 33-A which are arranged to engage the under side of the support member 29. A flexible shunt 37 serves to connect the shaft 30 to a terminal 38 for connecting the upper end of the reclosing fuse mechanism to a circuit. It will now be understood that the line side of the circuit may be connected, for example, to the terminal 38, while the load side may be connected to the terminal 18.

The details of construction of the fuse devices are somewhat similar to those disclosed in my copending application, Serial No. 734,262, filed July 9, 1934, and assigned to the assignee of this application. The details of construction of the fuse devices which are necessary to illustrate the present invention are shown in Figure 3 of the drawings, to which reference will now be had. As there shown, the fuse device, 21 for example, comprises a hollow fuse tube 39 formed of a suitable insulating material and having a fiber liner 40. The fuse tube 39 carries at its upper end the upper terminal or contact ferrule 34 and at its lower end the ferrule 24 secured thereto by a key 41 and slidably mounted within a sleeve or housing 42. It will be observed that the sleeve or housing 42 carries the trunnions 19 by means of which the fuse device is rotatably mounted at its lower end. Interposed between the ferrule 24 and the sleeve or housing 42 is a compression spring 43 which serves to bias the fuse tube 39 downwardly. The downward movement of the fuse tube 39 is restrained by a flexible cable 44 that depends from the fusible element carried in the upper end of the fuse device. The fusible element may be of any suitable construction, well known to those skilled in the art, and therefore a detailed description of it will not be set forth herein. The flexible cable 44 is positioned in a V-shaped groove 45 extending transversely across the inner end of a lever 46 and around a bolt 47 that is carried thereby. It will be observed that the lever 46 forms an anchor member for the flexible cable 44 to which it is attached. The lever 46 is fulcrumed at F at its outer end in a bifurcated arm 42—A on the housing 42, as illustrated. A thumb nut 47—A is provided for securing the flexible cable 44 in position around the bolt 47 and between it and a plate 46—A carried by the lever 46. The ferrule 24 is provided with an arm 48 having at its outer end a shoulder 49 disposed in engagement with the lever 46.

When the fusible element blows, the flexible conductor 44 is released for movement downwardly with the fuse tube 39 under the influence of the compression spring 43. Since the shoulder 49 is positioned relatively close to the fulcrum point F of the lever 46, the flexible cable 44 moves downwardly at a faster rate than does the fuse tube 39, thereby insuring that the arc formed by the blowing of the fusible element will be extinguished as rapidly as possible.

It will be observed, with particular reference to Figure 5 of the drawings, that the groove 45 is positioned substantially coaxially with the bore of the fuse tube 39. This construction leaves the lower end of this bore unobstructed and permits the free egress of gases generated as a result of the blowing of the fusible element. Consequently there is no momentary obstruction of the bore after the fuse blows and before the lever 46 has had an opportunity to move toward the position shown in Figure 4 of the drawings.

The disposition of the various parts after the fusible element has blown is illustrated more clearly in Figure 4 of the drawings. As there shown, the lever 46 has rotated in a counterclockwise direction, thereby permitting the ferrule 24 and the pins 25 carried thereby to move downwardly and out of engagement with the cooperating spring wires 26. This downward movement is limited by a stop bolt 50. When the pins 25 are moved out of engagement with the spring wires 26, the fuse device is no longer maintained in its normally operating position but, rather, it is free to rotate about the trunnions 19 under the influence of gravity to a position as illustrated in Figure 2 of the drawings. It will be understood that, in actual operation, the fuse device as illustrated in Figure 4 of the drawings will be reversed from that illustrated, and that the contact ferrule 34 will be down, in place of up, as shown. However, for the purpose of more clearly illustrating the comparison with the position of the various elements of the fuse device shown in Figure 3 of the drawings, it has been shown in the reversed position.

If it is desired to provide a translatory instead of rotary movement for the fuse device 21, for example, the stop bolt 50 may be omitted. The fuse tube 31 will then move downwardly through the sleeve or housing 42, as biased by the spring wires 26, the compression spring 43, the coil spring 36, and gravity, until the upper contact ferrule 34 engages the upper end of the housing 42, as shown in Figure 2—A. It will be apparent that this manner of operation will be effective to entirely remove the fuse device 21 from the circuit between the terminal connectors 18 and 38, thereby rendering unlikely the occurrence of a leakage path therebetween when the last fuse device has blown and, at the same time, the lower open end of the fuse tube 39 will open downwardly to prevent the entrance of rain, snow, etc., as would otherwise be the case if the tube were left in the position shown in Figure 2 of the drawings.

The flexible cable 44 must be securely held in position at its lower end around the bolt 47 by the thumb nut 47—A in order to restrain the various biasing forces that are present. For this purpose the inner surface of the nut 47—A facing the plate 46—A is provided with a plurality of concentric V-shaped grooves, as shown at 47—B in Figure 5—A. The opposing surface of the plate 46—A may be knurled, as shown at 46—B in Figure 5—B, or it may be provided with concentric V-shaped grooves 46—C as shown in Figure 5—C. In the latter construction the grooves 46—C are preferably arranged to interfit with or be complementary to the grooves 47—B in the nut 47—A. With either of these constructions the flexible cable is securely held against slipping.

Referring briefly to Figure 2 of the drawings, it will be observed that the fuse device 21 is illustrated in the position to which it may fall after its fusible element has blown. It will be understood that the fuse device 21 is rotated to this position as a result of the combined effects of the force of gravity and of the resilient force of the contact member 31, the construction of which is such as to tend to slightly bias the fuse device 21 to the operated position, as shown. If the shaft 30 is not restrained in some manner from rotation when the fuse device 21 blows and moves out of engagement with the contact member 31, the contact member 32 will be immediately moved into engagement with the upper contact ferrule 34 of the fuse device 22 to place it in the circuit between the terminals 38 and 18, as will be readily understood. At the same time the contact member 33 will be rotated in a clockwise direction from its position as illustrated by the broken lines. If the fuse device 22 also blows, then it also will rotate in a clockwise direction to take up the same position as indicated for the fuse device 21. The contact member 33 will then be operated into engagement with the upper contact ferrule 34 of the fuse device 23 and the circuit will be established therethrough. When this last fuse device is blown, the circuit is completely opened and will not be reestablished until the fuse devices 21, 22 and 23 are re-fused and restored to the normal operating positions.

As has been set forth hereinbefore, it is desirable to provide a predetermined time interval between the operation of one of the fuse devices, for example, the blowing of the fuse device 21, and the connection of the next fuse device 22 into the circuit. This time delay is of sufficient length to permit the fault to clear itself in the event that it is a fault of this type. According to my invention, I provide the desired time delay by preventing the rotation of the shaft 30 to cause the next contact member to engage the next fuse device until after the expiration of a predetermined interval. For this purpose the time delay mechanism, shown generally at 51 in Figures 1 and 2 of the drawings, is provided, the details of the construction of which are illustrated more clearly in Figures 6 and 7 of the drawings, to which reference will now be had. As there shown, a frame 52 is mounted on the upper support member 29 and it is arranged to carry short shafts 53 and 54 in suitable bearings 55 and 56 which depend from the under side of the frame 52. It will be observed that the adjacent ends of the short shafts 53 and 54 may be mounted in a common bearing 55, while the other end of the shaft 53 is mounted for rotation in the upper support member 29 itself. Springs 57 and 58 are provided for individually biasing the shafts 53 and 54 in a clockwise direction, as viewed in Figure 7, for a purpose which will be apparent hereinafter. Mounted for rotation with the shafts 53 and 54 are timing arms 61 and 62, respectively, the outer ends of which are arranged to engage the pointed ends of the upper contact ferrules 34. Transverse bars 63 and 64 are carried at the extreme outer ends of the timing arms 61 and 62, respectively, for engagement with the corresponding contact members 31 and 32, as illustrated. Rotatably mounted on the shafts 53 and 54 are detents 65 and 66 having slotted openings 67 and 68 therein for pins 69 and 70, respectively, which are secured to the shafts 53 and 54. Centering springs 71 and 72 are provided for biasing the detents 65 and 66 to the positions as shown in the drawings. The shaft 30 has mounted for rotation therewith cams 73 and 74 carrying rollers 75 and 76 which are disposed in the paths of movement of the detents 65 and 66, respectively. Sufficient freedom of downward rotation of the timing arms 61 and 62 is provided to permit the movement of the detents 65 and 66 out of the paths of the rollers 75 and 76 before the transverse bars 63 and 64 engage their respective contact members 31 and 32. It will be noted that the cams 73 and 74 are staggered slightly, so that while the roller 75 is in proximity to the detent 65 when the fuse device 21 is in position, the roller 76 is spaced from the detent 66 a distance which corresponds to the distance that the contact member 32 must move in order to engage the upper contact ferrule 34 of the fuse device 22.

The timing arms 61 and 62, through the agency of the detents 65 and 66, serve to control the rotation of the shaft 30 and thereby the movement of the contact members 32 and 33 for successively placing the fuse devices 22 and 23 into the circuit. As soon as the detents 65 and 66 are rotated out of the paths of movement of the rollers 75 and 76, respectively, the shaft 30 is free to rotate, as will be readily understood. The timing arms 61 and 62 are provided with individual time delay mechanisms which can be individually adjusted as desired. Each of the timing arms 61 and 62 is provided with ears 77 and 78 between which transverse pins 79 and 80 are mounted. These pins are arranged to individually engage time delay mechanisms which control the movement of the respective timing arms 61 and 62.

One of the time delay mechanisms is illustrated in detail in Figure 7 of the drawings. As there shown, the pin 79 of the timing arm 61 is arranged to engage a yoke 81 depending from the under side of a flexible bellows 82 which may be filled with a suitable liquid such as a mixture of alcohol and glycerine, as indicated hereinbefore. At the upper end of the bellows 82 a small aperture 83 is provided through which the liquid in the bellows 82 is forced to flow when the timing arm 61 is released by the falling of the fuse device 21. A needle valve 84, which may be adjusted by an adjusting screw 85, is provided for regulating the flow of liquid through the aperture 83. A flexible diaphragm 86 is provided for permitting the necessary adjustment and also for forming the upper wall of a chamber 87 into which the liquid is forced. This chamber is evacuated to an extent sufficient to permit the free flow of liquid into it. A compression spring 88 is provided within the flexible bellows 82, as illustrated, to overbalance the partial vacuum in the chamber 87 and restore the yoke 81 to its normal position when the timing arm 61 is restored to its normal position by the restoration of the fuse device 21 to operating position after it has been re-fused.

A suitable cover 89, formed preferably of sheet steel or the like, may be provided for housing the time delay mechanisms and shielding them from the effects of the weather.

In describing the operation of my fuse reclosing mechanism, it will be assumed that all of the fuse devices 21, 22 and 23 are disposed in the normal operating positions and that the circuit is completed through fuse device 21, fuse devices 22 and 23 being disconnected at their upper terminals from the circuit. The circuit will then extend from the terminal 18 through spring wires 26 or arms 16 and 17 to the lower end of the fuse device 21, the flexible conductor 44 and fusible element at its upper end, the upper contact ferrule 34, the contact member 31, shaft 30, flexible shunt 37, to the terminal 38. Assuming now that the fusible element of fuse device 21 blows, this device will be released as described hereinbefore, and will rotate to the position as shown in Figure 2 of the drawings. Since the contact arm 31 is no longer restrained from rotation by the fuse device 21, the spring 36 tends to rotate the shaft 30 in a clockwise direction as viewed in Figure 7 of the drawings. However, as soon as the roller 75 engages the detent 65, no further rotation of the shaft 30 can take place for the moment. The movement of the fuse device 21 from its normal position also releases the timing arm 61 and it is free to rotate in a clockwise direction under the influence of gravity and the spring 57 except as delayed by the flow of liquid from the flexible bellows 82 into the chamber 87. After the time interval for which the device is adjusted has elapsed, the timing arm 61 will rotate the detent 65 through the agency of the pin 69 until it is moved out of the path of the roller 75, thereby releasing the shaft 30 for movement under the influence of the spring 36. The contact member 32 is then caused to engage the upper contact ferrule 34 of the fuse device 22 and the circuit is reestablished therethrough. The timing arm 62 engages the pointed upper end of this contact ferrule, and this cycle of operation will be repeated when the fuse device 22 blows. The circuit will then be completed through the fuse device 23.

The reclosing fuse mechanism is restored to its normal operating condition by replacing as many of the fuse devices as have blown with fuse devices having fusible elements of the required capacity. The trunnions 19 are positioned in the slots of the arms 16 and 17 and the fuse devices are rotated in a counterclockwise direction. When the fuse device 21 is replaced, the upper end of the contact ferrule 34 first engages the timing lever 61 and later it engages the contact member 31. Since the movement of these two members is neither coaxial nor at the same speed, the detent 65 is not fastened directly to the timing arm 61, but rather, a limited relative movement is provided to permit the insertion of the fuse device 21 and the restoration of the time delay mechanism to a position where it will be operative when the fuse device 21 blows. The connection by means of the yoke 81 to the pin 79 is provided, rather than a direct pin connection, since the lower end of the flexible bellows 82 moves downwardly comparatively slowly while the timing lever 61 moves relatively rapidly when the fuse device 21 is restored into operative position.

It will be noted that the rollers 75 and 76 which are carried by the cams 73 and 74, after being released from their respective detents 65 and 66 on blowing of the fuse devices 21 and 22, ride up along the straight sides 91 and 92 of these detents and remain therealong until these fuse devices are re-fused and restored to the normal operating positions. The time delay devices are then effective to delay the rotation of the shaft 30 and the contact members 31, 32 and 33 carried thereby on rotation thereof in a clockwise direction, as viewed in Figure 7 of the drawings, but they are ineffective to delay rotation in the opposite direction which is caused by the engagement of the contact ferrule 34 of the fuse device 21 with the contact member 31, for example, when it is restored to operative position.

When all of the fuse devices are in their normal operating positions the relationship between the detent 66 and the roller 76 carried by the cam 74 will be as illustrated in Figure 8 of the drawings. The pin 70 will be spaced slightly from the right hand end of the slot 68, since the timing lever 62 has been moved upwardly by engagement of the bar 64 with the contact member 32. The lower end of the detent 66 will be in engagement with the roller 76 as biased by the centering spring 72. When the circuit is established through the fuse device 22, the shaft 30 will have rotated to such a position that the roller 76 will be slightly spaced from the detent 66 in the same manner that the roller 75 is spaced from the detent 65, as shown in Figure 7 of the drawings.

Since certain changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. In a drop out fuse device, in combination, a fuse tube adapted to be placed in operative position by a rotary movement and slidably mounted at its lower end, and latching means cooperating with said lower end for normally holding said fuse tube in a substantially upright position and against rotary movement, said latching means being released on blowing of the fusible element of said device to permit said fuse tube to slide to an alternate upright position.

2. In a drop out fuse device, in combination, a rotatably mounted sleeve, a fuse tube slidably mounted in said sleeve at its lower end and placed in operative position by rotation with said sleeve, said fuse tube being open at its lower end, latching means cooperating with said lower end for normally holding said fuse tube in a substantially upright position and against rotary movement, and spring means restrained by said latching means for biasing said fuse tube for movement relative to said sleeve, said latching means being released on blowing of the fusible element of said device to permit said fuse tube to slide to a vertical position through said sleeve, thereby keeping said open end of said fuse tube opening downwardly.

3. An automatic fuse restoring mechanism comprising, in combination, a plurality of fuse devices mounted for individual rotation at their lower ends, latching means at the lower ends of said fuse devices for holding them in an upright operating position against rotation and for releasing them on blowing for rotation under the influence of gravity, means for normally connecting one of said fuse devices in an electric circuit, and switching means for sequentially connecting the next fuse device at its upper end into said circuit when the preceding fuse device blows.

4. An automatic fuse restoring mechanism comprising, in combination, a plurality of fuse devices rotatably mounted at their lower ends, latching means at the lower ends of said fuse devices for holding them in an upright operating position against rotation, means for releasing said fuse devices on blowing for rotation under the influence of gravity, and switching means for sequentially connecting the next fuse device at its upper end into a circuit when the preceding fuse device is released.

5. An automatic fuse restoring mechanism comprising, in combination, a plurality of fuse devices mounted for individual rotation at their lower ends, holding means for independently securing said fuse devices at their lower ends in an upright operating position against rotation, means for releasing the holding means individual to each fuse on blowing thereof to permit rotation under the influence of gravity, means for connecting one of said fuse devices in an electric circuit at its upper end while the upper ends of the remaining fuse devices are unattached, and switching means for sequentially connecting the next fuse device in said circuit at its upper end on release of the preceding fuse device.

6. An automatic fuse restoring mechanism comprising, in combination, a plurality of fuse devices having upper and lower terminal members and mounted for individual rotation at their lower ends, means releasable on blowing of said fuse devices for individually latching said lower terminal members to hold said fuse devices and against rotation, means for commonly connecting said lower terminal members to an electric circuit, means for connecting the upper terminal of one of said fuse devices to complete said circuit while the other upper terminal members remain free, and switching means for sequentially shifting said circuit from one upper terminal member to the next on release of the preceding fuse device.

7. An automatic fuse restoring mechanism comprising, in combination, a support member, a lower mounting bracket carried by the lower end of said support member, a plurality of fuse devices having upper and lower terminal members and mounted for individual rotation on said lower mounting bracket, latching means individual to each of said lower terminal members for holding said fuse devices in a plane slightly inclined from the vertical and releasable on blowing thereof, an upper mounting bracket carried by the upper end of said support member, a shaft rotatably mounted on said upper mounting bracket; a plurality of contact fingers secured in staggered relation to said shaft, each of said fingers being aligned with one of said upper terminal members; and biasing means for urging one of said contact fingers into engagement with one of said upper terminal members and the next finger into engagement with the next upper terminal member on release of the preceding fuse device.

8. An automatic fuse restoring mechanism comprising, in combination, a support member, a lower mounting bracket carried by the lower end of said support member, a plurality of fuse devices having upper and lower terminal members and mounted for individual rotation on said lower mounting bracket, latching means individual to each of said lower terminal members for holding said fuse devices in a plane slightly inclined from the vertical and releasable on blowing thereof, an upper mounting bracket carried by the upper end of said support member, a shaft rotatably mounted on said upper mounting bracket; a plurality of contact fingers secured in staggered relation to said shaft, each of said fingers comprising a U-shaped member having the outer end upturned and each aligned with one of said upper terminal members; and a coil spring surrounding said shaft and interconnected between it and said upper mounting bracket for urging one of said contact fingers into engagement with one of said upper terminal members and the next finger into engagement with the next upper terminal member on release of the preceding fuse device.

9. An automatic fuse restoring mechanism comprising, in combination, an insulator, a conductor member carried by the lower end of said insulator and disposed to be connected to an electric circuit, a plurality of fuse devices having upper and lower terminal members and mounted for individual rotation about a common axis at their lower ends on said conductor member, latching means individual to each of said lower terminal members for holding said fuse devices in a plane slightly inclined from the vertical and releasable on blowing thereof, a conductor member carried by the upper end of said insulator and disposed to be connected to said circuit, a shaft formed of conducting material rotatably mounted on said last named conductor member; a plurality of contact fingers secured in staggered relation to said shaft, each of said fingers being aligned with the upper terminal member of one of said fuse devices; and biasing means for urging one of said fingers into contact engagement with one of said upper terminal members and the next finger into engagement with the next upper terminal member on release of the preceding fuse device.

10. An automatic fuse restoring mechanism comprising, in combination, an insulator, a conductor member carried by the lower end of said insulator and disposed to be connected to an electric circuit, a plurality of fuse devices having upper and lower terminal members and mounted for individual rotation about a common axis at their lower ends on said conductor member, latching means individual to each of said lower terminal members for holding said fuse devices in a plane slightly inclined from the vertical and releasable on blowing thereof, a conductor member carried by the upper end of said insulator and disposed to be connected to said circuit, a shaft formed of conducting material rotatably mounted on said last named conductor member; a plurality of contact fingers secured in staggered relation to said shaft, each of said fingers comprising a U-shaped member having the outer end upturned and each aligned with one of said upper terminal members; and a coil spring surrounding said shaft and interconnected between it and said last named conductor member for urging one of said contact fingers into engagement with one of said upper terminal members and the next finger into engagement with the next upper terminal member on release of the preceding fuse device.

11. An automatic fuse restoring mechanism comprising, in combination, a plurality of fuse devices mounted for individual rotation about a common axis at their lower ends, latching means at the lower ends of said fuse devices for holding them in a position slightly inclined from the vertical against rotation about said axis and for releasing them on blowing for rotation under the influence of gravity, means for normally connecting one of said fuse devices in an electric circuit, switching means for sequentially connecting the next fuse device at its upper end into said circuit when the preceding fuse device blows, and time delay means disposed to cooperate with said switching means for delaying the connection of the next fuse device into said circuit.

12. An automatic fuse restoring mechanism comprising, in combination, a plurality of fuse devices rotatably mounted at their lower ends, latching means at said lower ends for holding said fuse devices in an upright position against rotary motion, means for releasing said latching means on blowing of a fusible element to permit rotation under the influence of gravity, switching means for sequentially connecting the next fuse device at its upper end into a circuit when the preceding fuse device is released, and hydraulic escapement time delay means arranged and adapted to retard the movement of said switching means for delaying the connection of the next fuse device into said circuit.

13. An automatic fuse restoring mechanism comprising, in combination, a plurality of fuse devices mounted for individual rotation about a common axis at their lower ends, holding means for independently securing said fuse devices at their lower ends in a plane slightly inclined from the vertical, means for releasing the holding means individual to each fuse on blowing thereof to permit rotation under the influence of gravity, means for connecting one of said fuse devices in an electric circuit at its upper end while the upper ends of the remaining fuse devices are unattached, switching means for sequentially connecting the next fuse device in said circuit at its upper end on release of the preceding fuse device, and time delay means arranged and adapted to oppose the operation of said switching means for delaying the connection of the next fuse device into said circuit.

14. An automatic fuse restoring mechanism comprising, in combination, a plurality of fuse devices having upper and lower terminal members and mounted for individual rotation at their lower ends, means releasable on blowing of said fuse devices for individually latching said lower terminal members to hold said fuse devices against rotation, means for commonly connecting said lower terminal members to an electric circuit, means for connecting the upper terminal of one of said fuse devices to complete said circuit while the other upper terminal members remain free, switching means for sequentially shifting said circuit from one upper terminal member to the next on release of the preceding fuse device, and a regulatable hydraulic escapement time delay device arranged and adapted to control the movement of said switching means whereby the shifting of said circuit to the next upper terminal is delayed for a predetermined interval after the preceding fuse device is released.

15. An automatic fuse restoring mechanism comprising, in combination, a support member, a lower mounting bracket carried by the lower end of said support member, a plurality of fuse devices having upper and lower terminal members and mounted for individual rotation on said lower mounting bracket, latching means individual to each of said lower terminal members for holding said fuse devices in a plane slightly inclined from the vertical and releasable on blowing thereof, an upper mounting bracket carried by the upper end of said support member, a shaft rotatably mounted on said upper mounting bracket; a plurality of contact fingers secured in staggered relation to said shaft, each of said fingers being aligned with one of said upper terminal members; biasing means for urging one of said contact fingers into engagement with one of said upper terminal members and the next finger into engagement with the next upper terminal member on release of the preceding fuse device, and time delay means operatively connected to said shaft for preventing rotation thereof for a predetermined interval after each of the preceding fuse devices is released.

16. An automatic fuse restoring mechanism comprising, in combination, a support member, a lower mounting bracket carried by the lower end of said support member, a plurality of fuse devices having upper and lower terminal members and mounted for individual rotation on said lower mounting bracket, latching means individual to each of said lower terminal members for holding said fuse devices in a plane slightly inclined from the vertical and releasable on blowing thereof, an upper mounting bracket carried by the upper end of said support member, a shaft rotatably mounted on said upper mounting bracket; a plurality of contact fingers secured in staggered relation to said shaft, each of said fingers comprising a U-shaped member having the outer end upturned and each aligned with one of said upper terminal members; a coil spring surrounding said shaft and interconnected between it and said upper mounting bracket for urging one of said contact fingers into engagement with one of said upper terminal members and the next finger into engagement with the next upper terminal member on release of the preceding fuse device; a plurality of cams mounted in staggered relation on and rotatable with said shaft, each cam being individual to one of said preceding fuse devices; a plurality of timing levers rotatably mounted on said upper mounting bracket, each timing lever being normally in engagement with the upper terminal member of each preceding fuse device when its contact finger is in engagement therewith and in latching relation to the cam individual thereto; and time delay means individual to each of said timing levers for delaying the rotation thereof for a predetermined interval after release, thereby preventing the movement of the next contact finger into engagement with the next fuse device for a predetermined interval after the preceding fuse device has blown.

17. An automatic fuse restoring mechanism comprising, in combination, an insulator, a conductor member carried by the lower end of said insulator and disposed to be connected to an electric circuit, a plurality of fuse devices having upper and lower terminal members and mounted for individual rotation about a common axis at their lower ends on said conductor member, latching means individual to each of said lower terminal members for holding said fuse devices in a plane slightly inclined from the vertical and releasable on blowing thereof, a conductor member carried by the upper end of said insulator and disposed to be connected to said circuit, a shaft formed of conducting material rotatably mounted on said last named conductor member; a plurality of contact fingers secured in staggered relation to said shaft, each of said fingers being aligned with the upper terminal member of one of said fuse devices; biasing means for urging one of said fingers into contact engagement with one of said upper terminal members and the next finger into engagement with the next upper terminal member on release of the preceding fuse device; a plurality of cams mounted in staggered relation on and rotatable with said shaft, each cam being individual to one of said preceding fuse devices; a plurality of timing levers rotatably mounted on said last named conductor member, each timing lever being normally in engagement with the upper terminal member of each preceding fuse device when its contact finger is in engagement therewith and in latching relation to its individual cam; and a hydraulic escapement time delay device individual to each of said timing levers for delaying the rotation thereof for a predetermined interval after release, thereby preventing the movement of the next contact finger into engagement with the next fuse device for a predetermined interval after the preceding fuse device has blown.

18. An automatic fuse restoring mechanism comprising, in combination, a plurality of movably mounted fuse devices having terminal members at the ends thereof, latching means controlled by the fusible element of each device for releasing it on blowing for movement to an alternate position, means for commonly connecting the terminal members at one end of each fuse device to one terminal of an electric circuit, switch means directly engaging the other terminal member of one of said fuse devices for connecting it to another terminal of said circuit, and additional switch means controlled by movement of said one fuse device to said alternate position for directly engaging the other terminal member of the next fuse device for establishing said circuit therethrough.

19. An automatic fuse restoring mechanism comprising, in combination, a plurality of movably mounted fuse devices having terminal members at the ends thereof and normally disposed in an upright position, latching means at the lower end of each fuse device controlled by the fusible element thereof for releasing them for movement to alternate positions, means for commonly connecting the lower terminal members of said fuse devices to one terminal of an electric circuit, switch means directly engaging the upper terminal member of one of said fuse devices for completing said circuit therethrough, and additional switch means controlled by movement of said one fuse device to said alternate position for directly engaging the upper terminal member of the next fuse device for establishing said circuit therethrough.

20. An automatic fuse restoring mechanism comprising, in combination, an insulator, means for mounting said insulator in an upright position, a plurality of fuse devices movably mounted in an upright position on the lower end of said insulator and having terminal members at the ends thereof, latching means at the lower end of each fuse device controlled by the fusible element thereof for holding them in said upright position and for releasing them for movement to alternate positions, means for commonly connecting the lower terminal members of said fuse devices to one terminal of an electric circuit, transfer switch means mounted at the upper end of said insulator for successively directly engaging the upper terminal member of the next fuse device when the preceding fuse device blows, time delay means cooperating with said transfer switch for delaying the connection of the next fuse device for a predetermined interval, spring means for biasing said transfer switch means, and cam means cooperating with said time delay means to cause said spring means to operate said transfer switch with a snap action.

21. In a fuse device, in combination, a fuse tube having spaced terminals disposed to be connected by a fusible element in the bore thereof, and means for producing a positive gap and extending the gap and permitting free flow of the gases generated when the fusible element blows, said means comprising lever means disposed in such manner as to leave said bore substantially free, and a coiled spring disposed around said fuse tube and biasing said lever means.

22. In combination, a sleeve member constituting a terminal, a fuse tube slidable in said sleeve member, a second terminal for said fuse tube, said fuse tube being provided with an axial bore for positioning a fusibule element therein to interconnect said terminals, a lever rotatably mounted on said sleeve member about an axis laterally remote from the axis of said bore and restrained from rotation by said fusible element, said lever when restrained by said fusible element occupying a position approximately at right angles to said bore, spring means for biasing said fuse tube for movement relative to said sleeve member, and operating means movable with said fuse tube and extending laterally a substantial distance therefrom and engaging said lever close to its axis of rotation and remote from the axis of said bore.

23. In a fuse device, in combination, a housing, a fuse tube having an axial bore for containing therein a fusible element, said fuse tube being slidably mounted in said housing, spring means for biasing said fuse tube for movement relative to said housing, a lever controlled by said fusible element for opposing the action of said spring means, said lever being rotatably mounted on said housing about an axis laterally remote from said bore and when opposing the action of said spring means occupying a position approximately at right angles to said bore, and an operating arm carried by said fuse tube and extending laterally a substantial distance therefrom and engaging said lever near its axis of rotation.

24. In an expulsion fuse device, in combination, holding means for a flexible conductor which is attached to the fusible element and is released on blowing thereof including an anchor member, a threaded stud carried by said anchor member around which said conductor is placed, and a holding member threaded on said stud and movable away from and toward said anchor member, at least one of said members having concentric grooves in the side facing the other member to secure said conductor therebetween.

25. In an expulsion fuse device, in combination, holding means for a flexible conductor which is attached to the fusible element and is released on blowing thereof including an anchor member, a threaded stud carried by said anchor member around which said conductor is placed, and a clamp nut on said stud, said anchor member having a plurality of grooves concentric with said stud for securely holding said flexible conductor when it is forced into engagement therewith by said clamp nut.

26. In an expulsion fuse device, in combination, holding means for a flexible conductor which is attached to the fusible element and is released on blowing thereof including an anchor member, a threaded stud carried by said anchor member around which said conductor is placed, and a clamp nut on said stud, the surface of said anchor member being knurled adjacent said stud and the adjacent face of said clamp nut having concentric grooves for securely holding said flexible conductor therebetween when said clamp nut is forced into engagement therewith.

27. In an expulsion fuse device, in combination, holding means for a flexible conductor which is attached to the fusible element and is released on blowing thereof including an anchor member, a threaded stud carried by said anchor member around which said conductor is placed, and a clamp nut on said stud having a plurality of concentric grooves on the side facing said anchor member, said anchor member having a plurality of grooves concentric with said stud and disposed to have interfitting relation with said grooves on said clamp nut for securely holding said flexible conductor therebetween when said clamp nut is forced into engagement therewith.

28. In an automatic fuse restoring mechanism provided with at least three dropout fuse devices having terminal members at each end and commonly connected at one end to a line conductor, in combination, a shaft rotatably mounted adjacent the other end of said fuse devices, a plurality of contact fingers secured in staggered relation to said shaft and aligned with the terminal members of said fuse devices at said other end, and resilient means biasing said contact fingers to cause the next fuse device to be connected to a second line conductor when the preceding fuse device blows.

29. In an automatic fuse restoring mechanism provided with at least three dropout fuse devices having terminal members at each end commonly connected at one end to a line conductor, in combination, a shaft rotatably mounted adjacent the other end of said fuse devices, a plurality of contact fingers secured in staggered relation to said shaft and aligned with the terminal members of said fuse devices at said other end, resilient means biasing said contact fingers to cause the next fuse device to be connected to a second line conductor when the preceding fuse device blows, and time delay means arranged and adapted to retard the rotation of said shaft to connect the next fuse device to said second conductor only at the expiration of a predetermined interval after the preceding fuse device blows.

30. An electric switch comprising line terminals, a plurality of circuit closing means adapted to be engaged with one of the line terminals and moved into normal positions, holding means for maintaining said normal positions, means biasing the other line terminal to move toward the circuit closing means to engage one of said circuit closing means, said circuit closing means being arranged with respect to the biased line terminal so that each circuit closing means that is engaged by the movable line terminal prevents the other circuit closing means from being engaged, and means responsive to excess current conditions to permit movement of the individual circuit closing means from circuit closing positions whereby another becomes engaged.

31. An electric switch comprising line terminals, a plurality of circuit closing means adapted to be engaged with one of the line terminals and moved into normal positions, holding means for maintaining said normal positions, means biasing the other line terminal to move toward the circuit closing means to engage one of said circuit closing means, said circuit closing means being arranged with respect to the biased line terminal so that each circuit closing means that is engaged by the movable line terminal prevents the other circuit closing means from being engaged, means responsive to excess current conditions to permit movement of the individual circuit closing means from circuit closing positions whereby another becomes engaged, and means responsive to a predetermined amount of disengaging movement of one circuit closing means adapted to delay the engagement with the next circuit closing means to be connected.

32. A fuse switch comprising a lower line contact, a plurality of receiving sockets positioned thereon, collapsible fuse holders, fuse links therein normally supporting said holders against collapse, said holders being applicable to said sockets and rotatable into normal positions, means for maintaining said holders in said normal positions, a second line terminal normally biased toward the fuse holders and contacting one of the same, each fuse holder when a fuse blows therein being adapted to collapse and to move away from said biased line terminal, said line terminal then biasing to contact another fuse holder, a movable latch having means adapted temporarily to support said biased line terminal when a fuse holder collapses away therefrom, and means responsive to movement of the collapsed fuse holder whereby said latch releases said biased line terminal to contact the next fuse holder after the collapsed fuse holder moves to an open circuit position.

33. In a fuse switch, a biased and movable line terminal, a plurality of fuse holders having normal positions adapted to be contacted successively by said line terminal, and latch means adapted temporarily to hold said line terminal from successive fuse holders whenever a fuse holder which supports the biased line terminal moves into a circuit opening position.

34. In a fuse switch, a biased and movable line terminal, a plurality of fuse holders having normal positions adapted to be contacted successively by said line terminal, latch means adapted temporarily to hold said line terminal from successive fuse holders whenever a fuse holder which supports the biased line terminal moves into a circuit opening position, said latch means being responsive to the fuse holder which has moved to open circuit position to release the biased line terminal for contact with the next fuse holder.

35. A fuse switch comprising line terminals, fuse holders having terminal engaging elements, means associated with one line terminal for movably receiving fuse holders in any order, releasable latch means for holding said fuse holders each in a predetermined position, said latch means permitting manual removal of the fuse holders in any order, the other line terminal being movable and biased for successive contact with the fuse holders, said fuse holders being so arranged that only one at a time is contacted by the biased line terminal when the fuse holders are in their latched positions.

36. A fuse switch comprising line terminals, fuse holders having terminal engaging elements, means associated with one line terminal for removably receiving fuse holders in any order, releasable latch means for holding said fuse holders each in a predetermined position, said latch means permitting manual removal of the fuse holders in any order, the other line terminal being movable and biased for successive contact with the fuse holders, said fuse holders being so arranged that only one at a time is contacted by the biased line terminal when the fuse holders are in their latched positions, and means associated with each fuse holder responsive to excessive current conditions automatically to release the fuse holder from the latch and from said biased line terminal.

37. An automatic fuse restoring mechanism comprising, in combination, a plurality of fuse devices mounted for individual rotation at their lower ends, holding means for independently securing said fuse devices at their lower ends in an upright operating position against rotation, means for releasing the holding means individual to each fuse on blowing thereof to permit rotation under the influence of gravity, means for connecting one of said fuse devices in an electric circuit at its upper end while the upper ends of the remaining fuse devices are unattached, and switching means for sequentially connecting the next fuse device in said circuit at its upper end on release of the preceding fuse device.

38. In a repeating fuse device, a plurality of fuse units, each of said fuse units comprising a fuse tube having a fuse link therein, means for normally connecting the first of said fuse units to an electric line, the fuse tube of said first unit being movable as a whole from an operative to an inoperative position upon rupture of its fuse link, said connecting means including a movable contact member normally engaging the fuse tube of said first fuse unit and adapted to be moved into engagement with a next adjacent fuse tube upon movement of the fuse tube of said first fuse unit from the operative to the inoperative position for connecting an adjacent fuse unit to said electric line.

39. In a repeating fuse device, a plurality of fuse tubes, a fuse link in each of said fuse tubes, a common connection for connecting the lower ends of said fuse tubes to an electric circuit, and switching means at the upper ends of said fuse tubes for connecting said fuse tubes to said electric circuit in turn as a preceding fuse link is blown, said fuse tubes being movable from an operative to an inoperative position upon fusion of their respective fuse links, said switching means including a contact member adapted to normally engage the upper end of the first fuse tube when said tube is in the operative position, and means biasing said contact member into engagement with an adjacent subsequent fuse tube upon movement of said first fuse tube to the inoperative position.

40. In a repeating fuse device, a plurality of fuse tubes, a fuse link in each of said fuse tubes, a common connection for connecting the lower ends of said fuse tubes to an electric circuit, and switching means at the upper ends of said fuse tubes for connecting said fuse tubes to said electric circuit in turn as a preceding fuse link is blown, at least a portion of said fuse tubes being movable from an operative to an inoperative position upon fusion of their respective fuse links, said switching means including a contact member adapted to normally engage the upper end of the first fuse tube when said portion of said tube is in the operative position, means biasing said contact member into engagement with an adjacent subsequent fuse tube upon movement of said portion of said first fuse tube to the inoperative position, and means for resetting said contact member to reestablish the electric circuit through said first fuse tube upon movement of the movable portion thereof from the inoperative to the operative position.

41. In an expulsion fuse device, in combination, holding means for a flexible conductor which is attached to the fusible element and is released on blowing thereof including an anchor member, a threaded stud carried by said anchor member around which said conductor is placed, and a holding member threaded on said stud and movable away from and toward said anchor member, at least one of said members having its surface facing the other member grooved so as to secure said conductor therebetween when said holding member is tightened into place.

42. In an expulsion fuse device, in combination, holding means for a flexible conductor which is attached to the fusible element and is released on blowing thereof including an anchor member, a threaded stud carried by said anchor member around which said conductor is placed, and a clamp nut on said stud, said anchor member having its surface about said stud roughened for securely holding said flexible conductor when it is forced into engagement therewith by said clamp nut.

ALLAN RAMSEY.